No. 708,834. Patented Sept. 9, 1902.
G. W. SCHOFIELD.
AMUSEMENT OR ROUNDABOUT APPARATUS.
(Application filed Jan. 27, 1902.)
(No Model.) 3 Sheets—Sheet 1.
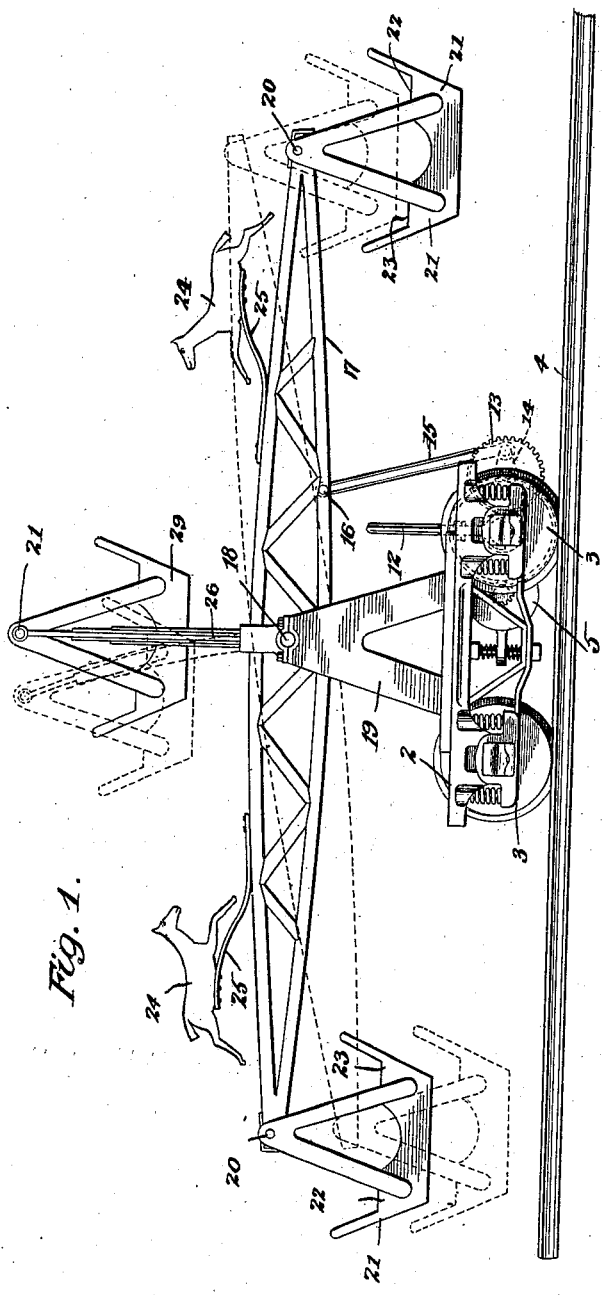
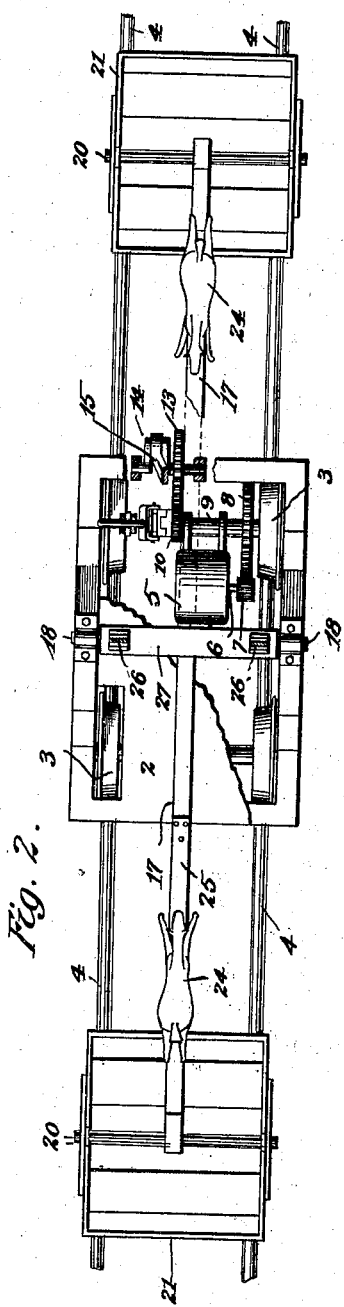

No. 708,834. Patented Sept. 9, 1902.
G. W. SCHOFIELD.
AMUSEMENT OR ROUNDABOUT APPARATUS.
(Application filed Jan. 27, 1902.)
(No Model.) 3 Sheets—Sheet 2.
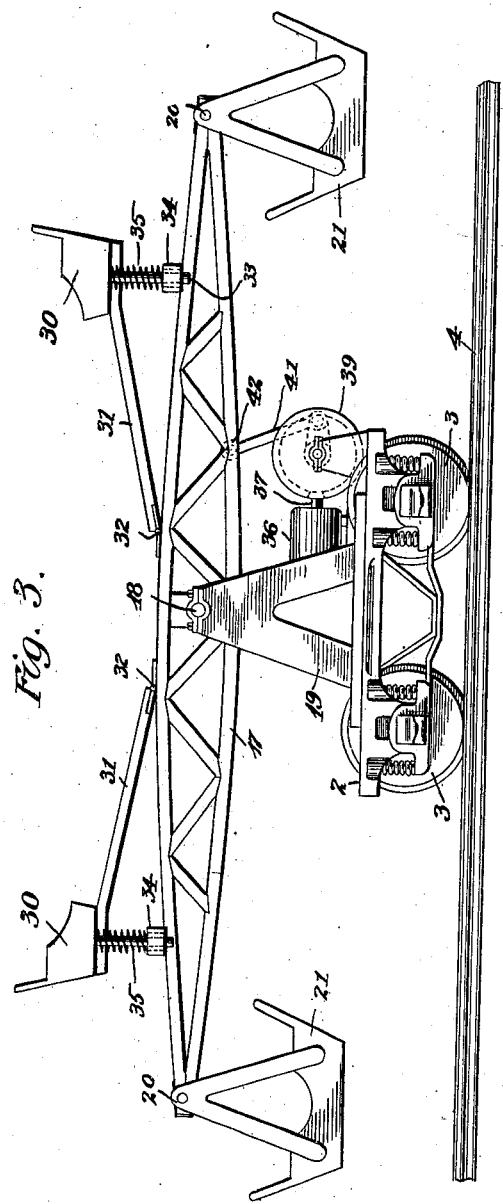
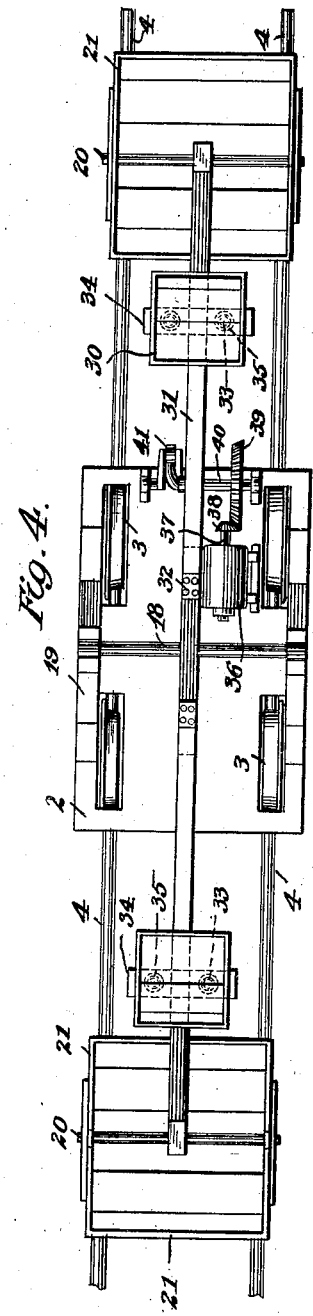

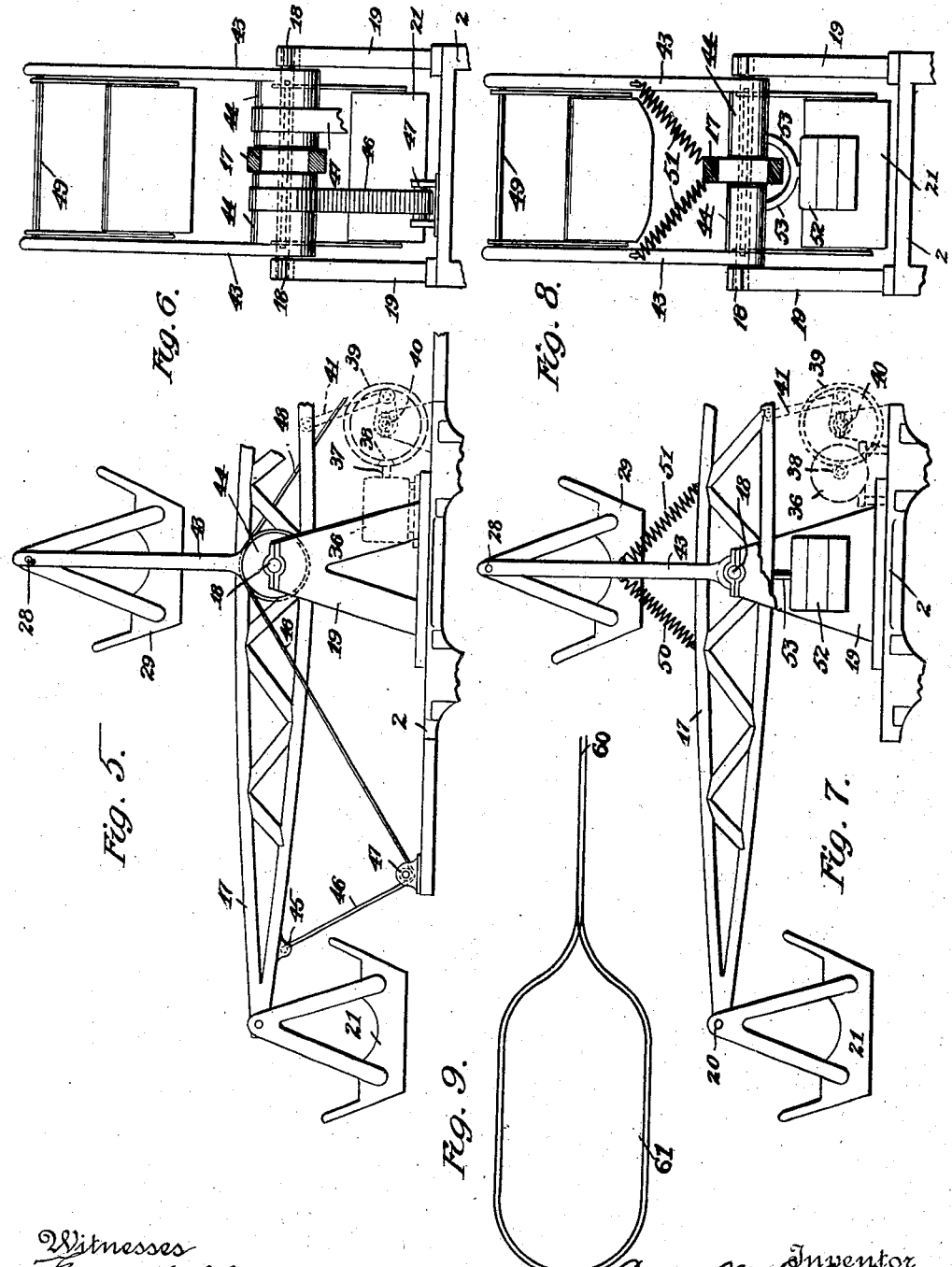

UNITED STATES PATENT OFFICE.

GEORGE W. SCHOFIELD, OF BROOKLYN, NEW YORK.

AMUSEMENT OR ROUNDABOUT APPARATUS.

SPECIFICATION forming part of Letters Patent No. 708,834, dated September 9, 1902.

Application filed January 27, 1902. Serial No. 91,493. (No model.)

*To all whom it may concern:*

Be it known that I, GEORGE W. SCHOFIELD, a citizen of the United States, residing in the borough of Brooklyn, New York city, county and State of New York, have invented certain new and useful Improvements in Amusement or Roundabout Apparatus, of which the following is such a full, clear, and exact description as will enable any one skilled in the art to which it appertains to make and use the same, reference being had to the accompanying drawings, forming part of this specification.

My invention relates to apparatus that is used for pastime and recreation; and the particular objects of the same are to provide an attractive apparatus possessing novel and amusing characteristics that will at once excite the curiosity of pleasure-seekers and will afford them in its use much pleasure.

To these ends my invention consists in the various novel and peculiar arrangements and combinations of the several parts of the apparatus, all as hereinafter fully described and then pointed out in the claims.

I have illustrated types of my invention in the accompanying drawings, wherein—

Figure 1 is a side view of a form of my improved apparatus, the dotted lines showing the position of certain parts of the apparatus when the same is swung in one direction of its movement. Fig. 2 is a plan view of the apparatus shown in Fig. 1 with the upper central swing removed and with a portion of the motor-car broken away to show its gearing. Figs. 3 and 4 show, respectively, side and plan views of a modified form of the apparatus. Fig. 5 is a side view of another modified form of my apparatus with one end thereof broken away, and Fig. 6 is an end view of this apparatus. Fig. 7 is a side view of another modified form of my improved apparatus, and Fig. 8 is an end view of the same. Fig. 9 is a diagrammatic view, on a reduced scale, showing the arrangement of car-tracks over which the car of the apparatus may be operated.

Referring to the drawings, in which like numbers of reference designate like parts throughout, 2 is a car having two sets of wheels 3, which are adapted to travel on rails 4, and this car is provided with a suitable motor 5, the shaft 6 of which carries a pinion 7, which drives a large gear-wheel 8 on the axle 9 of the car-wheels. By this means the car 2 is propelled in either direction along the track, and while the type of motor shown is an electric one any well-known form of motor may be used for this purpose, or the car may be drawn by a cable or other suitable means. On the driving-axle of the car-truck is fixed a pinion 10, which is provided with a clutch 11, having a hand-lever 12 for opening and closing it, so that when the clutch is closed the pinion 10 partakes of the motion of the axle; but when the clutch is open the pinion is at rest. This pinion 10 drives a larger gear 13, which actuates a crank-shaft 14, to the crank of which is connected a pitman 15, the other end of which is pivoted at 16 to an oscillating member or beam 17. The oscillating or rocking member 17 is provided at its center with a transverse horizontal shaft 18, which is mounted in suitable bearings upon standards 19, fixed upon the car 2 at opposite sides of the center thereof in rigid position. The member 17, which may be made of structural iron or other suitable material, is shown as a trussed or braced beam which tapers toward each end, where it carries a cross-bar 20, from each end of which is hung loosely a suitable swing 21, having two seats 22 and 23 arranged opposite each other vis-à-vis. These swings 21 depend below the ends of the beam and swing freely on the supporting-bars 20, and as the beam 17 is oscillated by the pitman 15 the swings alternately rise and descend through arcs in the vertical plane—that is, in the plane in which the beam oscillates—and in such rocking movement more or less motion is given to each swing, so that each one has a swinging motion of its own on the bar 20 as it sweeps up and down through the air. These swings of course may be arranged in any suitable manner upon the oscillating beam and may be mounted above the beam instead of below it, as shown. In addition to the beam carrying the passenger-swings 21 I also provide it, near each end, with small figures of animals 24, those shown being horses, which are fixed upon the end of spring-bars 25, which are secured to the beam 17. Passengers may sit upon these figures in the same manner that they use similar figures in a merry-go-round, and they are given the seesaw motion, which has a slight spring action in consequence of the spring-mounting of the figures.

At the center of the rocking member or beam 17 I mount the upright spring supports or frame 26, which are shown as made up of laminated pieces of spring material which are secured to a fixed cross-piece 27 on the beam above its axle 18. To the upper end of these spring-supports I pivot at 28 a third swing, similar to the swings 21. This central swing 29 is given an oscillating movement back and forth above the beam, the throw of such movement depending upon the height of the spring-supports 26. In addition to this upper swing being given this oscillation by virtue of its connection with the oscillating beam I also provide an additional motion for it in the way of a yielding or spring motion, which is imparted thereto by virtue of the yielding quality of its support or frame 26, which is so constructed that it yields in the plane of oscillation. When the beam 17 is rocked on its axle so that one end is lowered while the other is raised, as shown in dotted lines in Fig. 1, the upper swing is thrown over toward the low end of the beam, and when the end of the stroke is reached the momentum, which increases with the weight of the passengers, causes the spring supporting-frame of this swing to yield or be bent outwardly still farther toward the low end of the beam, and this peculiar yielding or resilient effect gives this particular swing a quality not found in the others, and passengers using it are caused to experience a somewhat-different sensation than is found in the use of the other swing.

In using this apparatus, after the passengers are seated in the various swings, or upon the seats or figures provided for passengers upon the oscillating beam, the car-motor is started and it drives the car slowly along the track, and the clutch 11 being closed the oscillating beam 17 carrying the passengers is given a slow rocking motion in the vertical plane, so that the passengers are carried through compound motions resulting from the oscillation of the beam and the translation of the car. When it is desired to move the apparatus from place to place or to run it over the track without oscillating the beam carrying the swings, this may be done by opening the clutch 11 and running the motor which propels the car, the motor being so arranged that it may drive the car in either direction.

In the construction of the apparatus shown in Figs. 3 and 4 the upper swing is omitted and the figures near each end of the beam are replaced by seats 30, which are secured to the end of an arm 31, hinged at 32 to the upper side of the beam, each seat being mounted upon vertical rods 33, which pass loosely through holes in a fixed cross-piece 34 and are provided with compression-springs 35, interposed between the under side of the seat and the upper side of the cross-piece 34 and surrounding the rods 33. As the beam 17 is oscillated on its center the weight of the passengers in the seats 30 will cause the springs to act at each end of the stroke and impart to the seats a peculiar spring action. In this form also the oscillating member or beam 17 is actuated by a motor of its own, the same being shown at 36 as located upon the car 2 and through means of its shaft 37 and a small beveled gear 38 driving a large beveled gear 39, which in turn operates the crank-shaft 40, to the crank of which is connected the pitman 41, having its upper end pivoted at 42 to the beam.

In the construction shown in Figs. 5 and 6 the swing 29, which is pivoted at 28 to the frame, is given a yielding motion in the plane of oscillation by virtue of its supporting-frame 43 being loosely journaled about the shaft 18, on which the beam 17 rocks. The lower end of each of the said frames 43, carrying the swing, are provided with large cylindrical tubular members or hubs 44, which project inwardly under the swing and surround the shaft 18, upon which they turn. From one end of the beam 17, at a point 45 underneath the same, extends a band 46, which passes under a guide-pulley 47 upon a suitable fixed extension of the car 2 to the upper side of the hub 44 of one of the side frames 43 and thence around the same and is attached thereto. A similar band 48 is fixed to the other hub 44, passing around the same and thence under a guide-pulley similar to 47, extends to the opposite end of the oscillating beam 17. These bands are made taut and are practically the same length, as will be understood from Fig. 5, in which the bands are shown as wrapped for about the same distance around their respective hubs 44 in consequence of the beam standing in horizontal position. When the beam is oscillated by lowering, for instance, the left-hand end thereof, as observed from this figure, the stretch of band 46 between the fixed point 45 and its hub is slackened, while the band 48, owing to its end of the beam being raised, is tightened and drawn upon to such an extent that it pulls its attached hub slightly around on the axle 18, thereby throwing the frame 43 of the swing, which is connected at its upper end by a bar 49, over toward the high side of the beam. When the beam is tipped in the other direction, the opposite action takes place, the band 46 being tightened, while the band 48 is slackened, and the swinging frame 43 is thrown over toward the then high side of the beam. In this way the yielding motion of the upper swing-frame in the plane of oscillation is provided for. In this form also the beam is shown as operated by a motor 36, independent of the car-motor. This motor has a shaft 37, driving a pinion 38, which actuates the large pinion 39, through which motion is given to the crank-shaft 40 and thence to the pitman 41.

In the construction shown in Figs. 7 and 8 the upper swing 29 is pivoted at 28 to the yielding support or frame 43, which is connected at the top by a rigid bar 49 and which at the lower end is provided with inwardly-extending tubular members 44, which afford bearings for the shaft or axle 18, which is mounted in the uprights 19 and upon which the oscillating beam 17 has its motion. The swing-frame 43 thus has a motion of its own on the axle 18; but it is attached to the oscillating beam 17 through means of a set of oppositely-acting springs 50 and 51, which act in pairs upon opposite sides of the swing-frame and in the plane of oscillation. Below the center of the beam 17 is arranged a set of counterweights 52, suspended from a supporting-bracket 53, which is rigidly connected with each of the hubs 44, so that the weights counterbalance the swing structure above the axle. When the oscillation of the beam causes the upper swing to plunge to one side or the other by reason of its momentum, these weights counteract this effect, as also do the springs, and this is another form in which I accomplish the idea of having the swing, which is controlled by an oscillating member adapted to yield in the plane of oscillation and to a point beyond that which is given it by such oscillating member—that is to say, the supporting-frame of each of the upper swings herewith shown are so constructed that they have capacity of moving to one side or the other or yielding in the plane of oscillation to a point beyond that which such frame would reach if the frame were non-yielding and rigidly connected to the oscillating beam.

In Fig. 9 I show the arrangement of a car-track for the car to travel on, the track starting at a point 60 and running back straight for a slight way, then curving around into a large loop 61 and switching onto the straight stretch returns to the starting-point 60. In operating the oscillating swing-carrier upon this track the car is run down, say, from the point 60 along the straight portion of the track, thence around the loop, and back on the other straight part of the track to the terminal 62, which in the next operation of the machine becomes the starting-point, so that the apparatus is reversed in each complete trip that it makes. This general arrangement of car-track is adopted for the purpose of having the straight portions of the track placed on a narrow lot—say a twenty-five-foot lot—while the larger area back of such lot is occupied by the expanded loop of the track.

In setting forth my improved apparatus I have not observed particularly the proportions of the various parts, and the same may be changed as desired. For example, the axle or shaft 18 of the oscillating beam may be placed some eight feet above the ground, or it may be located much higher than that, while the length of beam may be twenty-eight to thirty feet or much longer. Of course the larger the apparatus the greater will be the range of movement to which the various swings and seats can be subjected and the greater will be the sensation of the person using it. Instead of the oscillating swing-carrying mechanism being mounted on a car which is moved over a track it may be placed upon any sort of vehicle which may be run over an ordinary road or path, or it may be placed upon a float which is moved through the water.

By virtue of the peculiar perambulating, roving, or migratory characteristic of my novel apparatus, which is on the order of a roundabout, the seesaw-like swing or seat carrying mechanism is given additional attractive and curious features, which are well calculated to excite the curiosity of pleasure-seekers who frequent resorts where this general class of apparatus finds its greatest use. While possessing these curious features and serving to give the passengers novel and pleasant sensations, yet the apparatus is not one that is attended with any particular danger or risk to the passengers' safety, as is the case with some well-known forms of recreation apparatus. It will be obvious that the car or carrier may be made to traverse any desired route, and where such route should extend over a considerable area and traverse several blocks or streets of a village the curiously-acting apparatus traveling from place to place will appear picturesque and create much interest in itself, which is the object sought by the operators of such devices.

In constructing the apparatus an ordinary self-propelling car may be used, and the superstructure thereon supporting the axle of the oscillating beam may be made of structural iron, likewise the beam itself, and any ordinary form of swing may be adopted. The spring or non-swinging seats when used upon the beam may be made in any desirable shape, and considerable taste can be displayed in respect to these features, as well as the feature of the swings.

I wish to be understood as not limiting my invention to the specific form of constructions herewith set forth, as it is evident that modifications may be made in the various parts thereof without, however, departing from the spirit of the invention.

Having thus described my invention, what I claim, and desire to secure by Letters Patent, is—

1. An apparatus for recreation consisting in the combination of an oscillating member or beam, and one or more swings hung from said member or beam, a suitable carrier or car upon which said member or beam is mounted, and means for moving said carrier or car, substantially as and for the purpose set forth.

2. An apparatus for recreation consisting in the combination of an oscillating member or beam adapted to carry persons thereon, means for oscillating said member or beam, and a carrier or car having means for moving the same and upon which is mounted said oscillating member or beam, substantially as and for the purpose set forth.

3. An apparatus for recreation consisting in the combination of a suitable carrier or car provided with means for moving the same, an oscillating member or beam mounted upon said carrier or car and adapted to carry persons thereon, and mechanism mounted upon said carrier or car for oscillating said member or beam, substantially as and for the purpose set forth.

4. An apparatus for recreation consisting in the combination of a suitable carrier or car and means for moving the same, an oscillating member or beam mounted at about its center of length upon said carrier or car and adapted to oscillate thereon and means for oscillating it, and a swing suspended from each end of said member or beam, substantially as and for the purpose set forth.

5. An apparatus for recreation consisting in the combination of an oscillating member or beam, an upright support or frame oscillated by said member and adapted to yield in the plane of oscillation, and a swing hung upon said frame and the momentum of which causes said support or frame to move or yield in the plane of oscillation, a suitable carrier or car upon which said member or beam is mounted, and means for moving said carrier or car, substantially as and for the purpose set forth.

In testimony whereof I have hereunto set my hand in the presence of the two subscribing witnesses.

GEORGE W. SCHOFIELD.

Witnesses:
WILLIS FOWLER,
SAMUEL M. CHESNUT.